US012711612B2

(12) United States Patent
Kikuchi

(10) Patent No.: US 12,711,612 B2
(45) Date of Patent: Aug. 18, 2026

(54) INFORMATION PROCESSING APPARATUS, INFORMATION PROCESSING METHOD, AND NON-TRANSITORY STORAGE MEDIUM

(71) Applicant: CANON KABUSHIKI KAISHA, Tokyo (JP)

(72) Inventor: Toru Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 18/049,591

(22) Filed: Oct. 25, 2022

(65) Prior Publication Data

US 2023/0142763 A1 May 11, 2023

(30) Foreign Application Priority Data

Nov. 11, 2021 (JP) ................................ 2021-184189

(51) Int. Cl.
*G06T 7/00* (2017.01)
*G06F 3/14* (2006.01)

(52) U.S. Cl.
CPC .............. *G06T 7/0012* (2013.01); *G06F 3/14* (2013.01)

(58) Field of Classification Search
CPC ................................ G06T 7/0012; G06F 3/14
USPC ........................................................ 382/128
See application file for complete search history.

(56) References Cited

U.S. PATENT DOCUMENTS

2020/0391053 A1* 12/2020 Koyama .................. A61B 8/14
2021/0192738 A1 6/2021 Meguro
2021/0224599 A1* 7/2021 Tajima .............. G06F 18/24147
2022/0358640 A1 11/2022 Sakashita

FOREIGN PATENT DOCUMENTS

CN 102479385 A 5/2012
CN 110663251 A 1/2020
JP H0737056 A 2/1995
JP 2014050527 A 3/2014
WO 2021/020419 A1 2/2021

OTHER PUBLICATIONS

Matias Riihimäki et al., Clinical landscape of cancer metastases, Cancer Medicine, Nov. 2018.
European Patent Office, Extended Search Report for Application No. 22205889.3, Mar. 2023.

(Continued)

*Primary Examiner* — Gabriel I Garcia
(74) *Attorney, Agent, or Firm* — Canon U.S.A., Inc. IP Division

(57) ABSTRACT

According to an aspect of the present invention, an information processing apparatus includes a detection result acquisition unit configured to acquire a result of detecting a lesion from medical image data, an instruction reception unit configured to receive an instruction for specifying a target lesion based on the detection result, a related lesion information acquisition unit configured to acquire information about a lesion related with the specified target lesion, the lesion being of a different type from the target lesion, and a display control unit configured to control a display unit to display the information about the related lesion.

14 Claims, 11 Drawing Sheets

(56) References Cited

OTHER PUBLICATIONS

Han Guang-Hui et al., Automated Detection of Lesion Regions in Lung Computed Tomography Images: A Review, ACTA Automatica Sinica, Dec. 2017, vol. 43, No. 12.

Xu Lingyi et al., Design of Diagnosis Support System Based on Magnetic Resonance Imaging and Spectroscopy, Chinese Journal of Biomedical Engineering, Aug. 2016, vol. 35, No. 4.

Ke Yan et al., DeepLesion: automated mining of large-scale lesion annotations and universal lesion detection with deep learning, Jul.-Sep. 2018, vol. 5(3).

* cited by examiner

101
INFORMATION PROCESSING APPARATUS
202
ROM
203
CPU
204
RAM
205
LAN
INTERFACE
211
206
DISPLAY
INTERFACE
201
STORAGE
MEDIUM
208
INPUT
INTERFACE
DISPLAY
207
MOUSE
210
KEYBOARD
209
LAN
103

400
401
402
403
411
421-1
421-2
421-3
421-4
431-1
431-2
431-3
LESION TYPE 1-1 DETECTED
LESION TYPE 1-2 DETECTED
LESION TYPE 2-1 DETECTED
LESION TYPE 2-2 DETECTED
LESION TYPE 3 NOT DETECTED
LESION TYPE 4-1 DETECTED
LESION TYPE 5 NOT IMPLEMENTED

101
INFORMATION PROCESSING APPARATUS
311
IMAGE DATA ACQUISITION UNIT
312
LESION DETECTION UNIT
313
DETECTION RESULT ACQUISITION UNIT
614
INSTRUCTION RECEPTION UNIT
315
RELATED LESION INFORMATION ACQUISITION UNIT
316
DISPLAY CONTROL UNIT
103
LAN
102
MEDICAL CASE DB
MEDICAL IMAGE DATA 1
MEDICAL IMAGE DATA 2
MEDICAL IMAGE DATA 3
321-1
321-2
321-3

700
401
402
421-1
421-2
421-3
421-4
403
431-1
431-2
431-4
404
LESION TYPE 1-1 DETECTED
LESION TYPE 1-2 DETECTED
LESION TYPE 2-1 DETECTED
LESION TYPE 2-2 DETECTED
LESION TYPE 3 NOT DETECTED
LESION TYPE 4-1 DETECTED
LESION TYPE 5 "NOT IMPLEMENTED", FEASIBLE
WILL YOU IMPLEMENT PROCESSING FOR DETECTING LESION TYPE 5?
YES
NO 900
401
402
421-1
421-2
421-3
421-4
403
431-2
431-4
431-5
431-6
405
LESION TYPE 1-1 DETECTED
LESION TYPE 1-2 DETECTED
LESION TYPE 2-1 DETECTED
LESION TYPE 2-2 DETECTED
LESION TYPE 4-1 DETECTED
LESION TYPE 5 "NOT IMPLEMENTED", FEASIBLE
LESION TYPE 6 INFEASIBLE, "NOT INSTALLED"
LESION TYPE 7 INFEASIBLE, "OUT OF APPLICABLE CONDITION"
WILL YOU INSTALL FUNCTION OF DETECTING LESION TYPE 6?
YES
NO

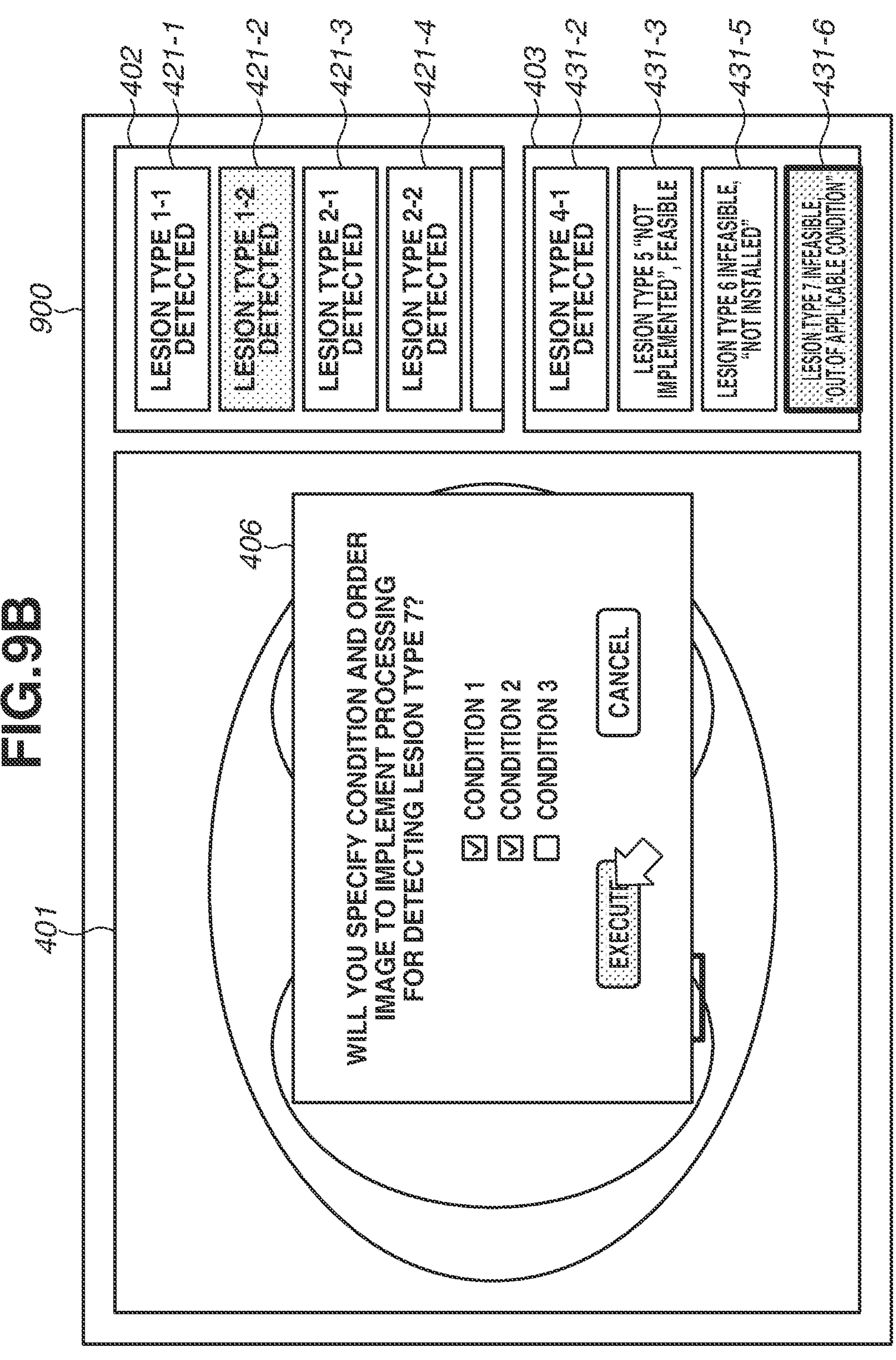
FIG.9B
900
401
402
421-1
421-2
421-3
421-4
403
431-2
431-3
431-5
431-6
406
LESION TYPE 1-1 DETECTED
LESION TYPE 1-2 DETECTED
LESION TYPE 2-1 DETECTED
LESION TYPE 2-2 DETECTED
LESION TYPE 4-1 DETECTED
LESION TYPE 5 "NOT IMPLEMENTED", FEASIBLE
LESION TYPE 6 INFEASIBLE, "NOT INSTALLED"
LESION TYPE 7 INFEASIBLE, "OUT OF APPLICABLE CONDITION"
WILL YOU SPECIFY CONDITION AND ORDER IMAGE TO IMPLEMENT PROCESSING FOR DETECTING LESION TYPE 7?
CONDITION 1
CONDITION 2
CONDITION 3
EXECUTE
CANCEL

INFORMATION PROCESSING APPARATUS, INFORMATION PROCESSING METHOD, AND NON-TRANSITORY STORAGE MEDIUM

BACKGROUND OF THE INVENTION

Field of the Invention

The present disclosure relates to an information processing apparatus that displays other lesions related with a lesion targeted by a user, an information processing method, and a non-transitory storage medium.

Description of the Related Art

Computer-Aided Detection (CADe) is known to analyze a medical image by using a computer to detect a candidate of a lesion as an abnormality accompanying a disease. With the advance in the Artificial Intelligence (AI) technology, the number of detection target lesions is currently increasing.

A medical diagnosis support apparatus discussed in Japanese Patent Application Laid-Open No. 7-37056 divides medical image data into microregions, calculates a feature quantity for each of the microregions, and superimposes image data with different display densities or display colors onto the medical image data according to the feature quantity to display the medical image data.

However, the technique discussed in Japanese Patent Application Laid-Open No. 7-37056 discusses the use of a different display form for each lesion portion according to the feature quantity but does not consider the display of other lesions related with a lesion targeted by a user such as a doctor.

SUMMARY OF THE INVENTION

According to an aspect of the present invention, an information processing apparatus includes a detection result acquisition unit configured to acquire a result of detecting a lesion from medical image data, an instruction reception unit configured to receive an instruction for specifying a target lesion based on the detection result, a related lesion information acquisition unit configured to acquire information about a lesion related with the specified target lesion, the lesion being of a different type from the target lesion, and a display control unit configured to control a display unit to display the information about the related lesion.

Further features of the present invention will become apparent from the following description of exemplary embodiments with reference to the attached drawings.

BRIEF DESCRIPTION OF THE DRAWINGS

FIG. 9B illustrates another example of the user interface screen of the information processing apparatus according to the third exemplary embodiment.

DESCRIPTION OF THE EMBODIMENTS

Figure 1:
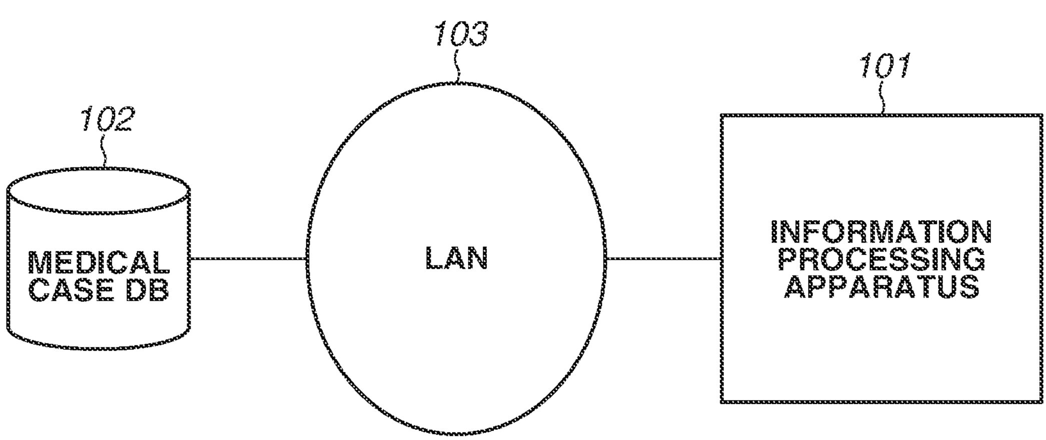
FIG. 1 illustrates a configuration of an information processing system according to first to third exemplary embodiments.

The present invention will be described below based on exemplary embodiments with reference to the accompanying drawings. Unless otherwise noted, items described in other exemplary embodiments are assigned the same reference numerals, and redundant descriptions thereof will be omitted. Configurations described in the following exemplary embodiments are to be considered as illustrative, and the present invention is not limited to illustrated configurations. Each of the embodiments of the present invention described below can be implemented solely or as a combination of a plurality of the embodiments or features thereof where necessary or where the combination of elements or features from individual embodiments in a single embodiment is beneficial.

A first exemplary embodiment will be described below centering on an information processing apparatus that displays medical image data such as X-ray Computed Tomography (CT) image data and Magnetic Resonance Imaging (MRI) image data.

The information processing apparatus according to the first exemplary embodiment includes a lesion detection unit, e.g., Computer-Aided Detection (CADe) for detecting a lesion in the medical image data. When the lesion detection unit detects a candidate of a lesion (hereinafter a candidate of a lesion is simply referred to as a lesion), the information processing apparatus displays the detection result to a user. When the user such as a doctor specifies the detected lesion, the information processing apparatus determines the types of lesions related with the lesion and displays a detection result of CADe for the types of related lesions. Examples of types of lesions to be detected by CADe include a pulmonary nodule, chest wall mass, peritoneal mass, liver mass, pancreatic mass, nephroma mass, large intestine mass, reticulation, honeycomb lung, bronchodilation, pleurisy, pleural effusion, tendovaginitis, bone erosion, osteitis, pancreas hypertrophy, and pancreas necrosis.

(System Configuration)

FIG. 1 illustrates a configuration of an information processing system including the information processing apparatus according to the present exemplary embodiment.

Referring to FIG. 1, the information processing system includes a medical case database (hereinafter referred to as a medical case DB) 102, an information processing apparatus 101, and a Local Area Network (LAN) 103.

The medical case DB 102 stores medical image data captured by a medical imaging apparatus such as a Computed Tomography (CT) apparatus. The medical case DB 102 further includes a database function for providing the information processing apparatus 101 with medical image data via the LAN 103. More specifically, the medical case DB 102 according to the present exemplary embodiment is known Picture Archiving and Communication Systems (PACS).

(Hardware Configuration)

Figure 2:
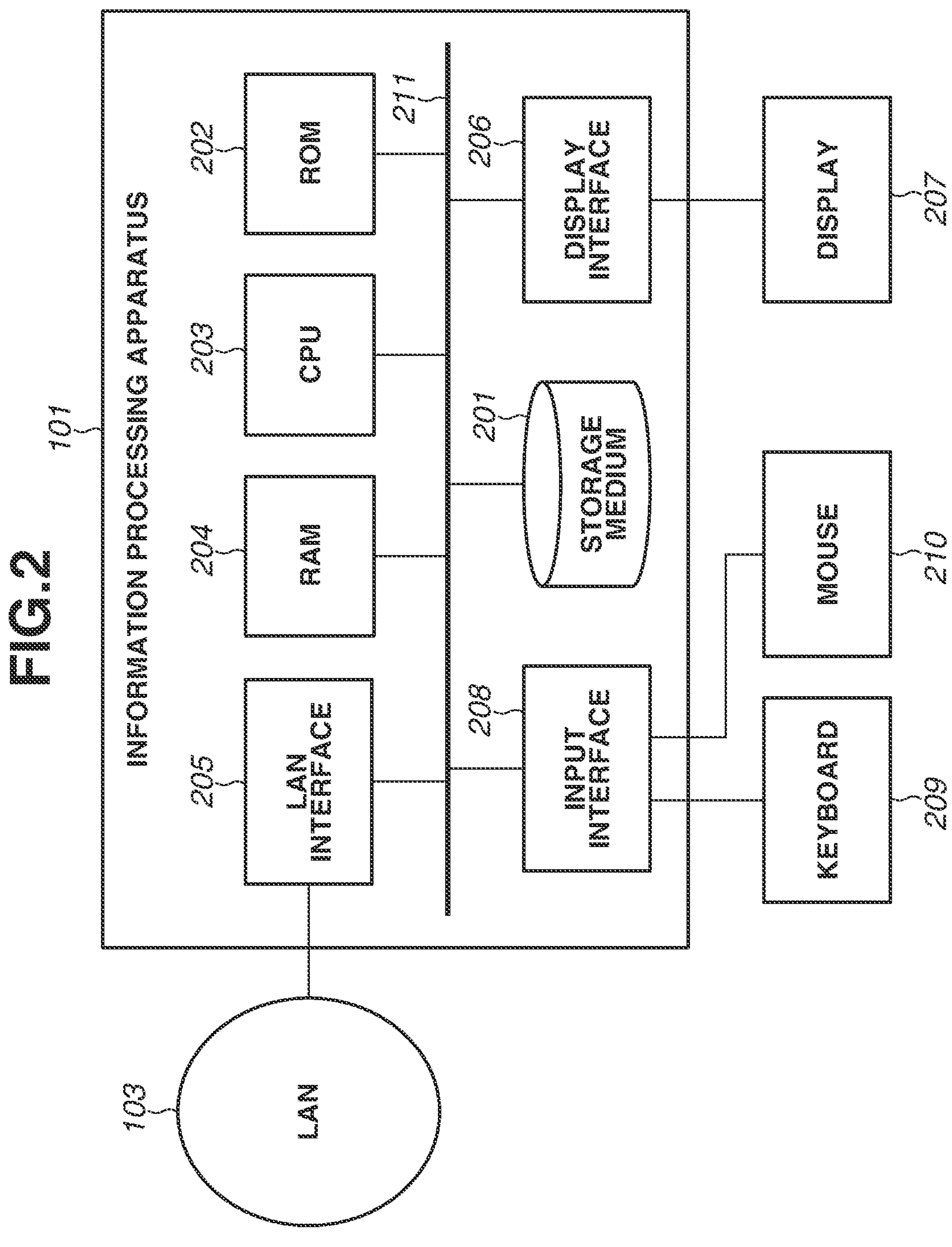
FIG. 2 illustrates a hardware configuration of an information processing apparatus according to the first to third exemplary embodiments.

FIG. 2 illustrates a hardware configuration of the information processing apparatus 101 according to the present exemplary embodiment.

Referring to FIG. 2, the information processing apparatus 101 includes a storage medium 201, a Read Only Memory (ROM) 202, a Central Processing Unit (CPU) 203, and a Random Access Memory (RAM) 204.

The information processing apparatus 101 further includes a LAN interface 205, an input interface 208, a display interface 206, and an internal bus 211.

The storage medium 201 is, for example, a Hard Disk Drive (HDD) that stores an Operating System (OS), processing programs for performing various kinds of processing according to the present exemplary embodiment, and various kinds of information. The ROM 202 stores a program such as a Basic Input Output System (BIOS) that initializes the hardware and activates the OS. The CPU 203 performs calculation processing when executing the BIOS, the OS, and the processing programs. The RAM 204 temporarily stores information used when the CPU 203 executes a program. The LAN interface 205 conforming to the Institute of Electrical and Electronics Engineers (IEEE) 802.3ab enables the information processing apparatus 101 to perform communication via the LAN 103. A display 207 displays user interface screens. The display interface 206 converts screen information to be displayed on the display 207 into a signal and outputs the signal to the display 207. A keyboard 209 inputs key entries. A mouse 210 specifies a coordinate position on the screen and inputs a button operation. The input interface 208 receives signals from the keyboard 209 and the mouse 210. The internal bus 211 transmits signals in communication between blocks.

(Functional Configuration)

Figure 3:
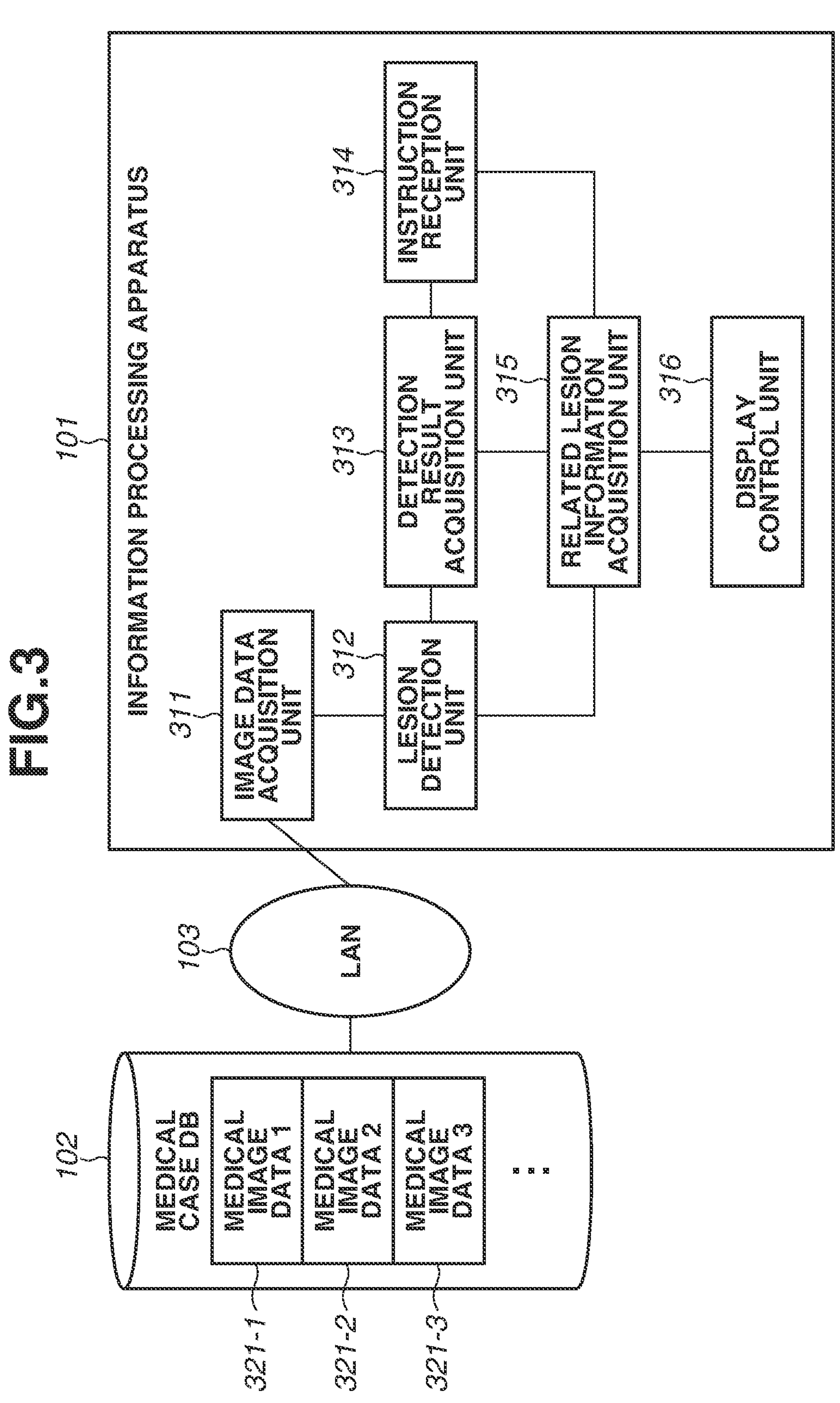
FIG. 3 illustrates a functional configuration of the information processing apparatus according to the first exemplary embodiment.

FIG. 3 illustrates a function configuration of the information processing apparatus 101 according to the present exemplary embodiment.

Referring to FIG. 3, the information processing apparatus 101 includes an image data acquisition unit 311, a lesion detection unit 312, a detection result acquisition unit 313, an instruction reception unit 314, a related lesion information acquisition unit 315, and a display control unit 316.

Referring to FIG. 3, the medical case DB 102 stores medical image data 321-*i* (i=1, 2, 3, . . . ) and provides the information processing apparatus 101 with the medical image data 321-*i* (i=1, 2, 3, . . . ) via the LAN 103. The medical image data 321-*i* (i=1, 2, 3, . . . ) is, for example, a Digital Imaging and Communications in Medicine (DICOM) file.

The image data acquisition unit 311 acquires the medical image data 321-*i* (i=1, 2, 3, . . . ) to be subjected to inspection from the medical case DB 102 via the LAN 103. According to the present exemplary embodiment, the acquisition of the medical image data 321-*i* (i=1, 2, 3, . . . ) conforms to DICOM.

The lesion detection unit 312 detects a plurality of types of lesions from the acquired medical image data 321-*i* (i=1, 2, 3, . . . ). A detector where a Convolutional Neural Network (CNN) as one of deep learning models has been subjected to learning is used for lesion detection. In the learning of the detector, a set of medical image data and ground truth data indicating lesion regions in the medical image data is used as teacher data. The medical image data of the teacher data is input to the CNN. CNN parameters are adjusted to minimize the difference between the output value of the CNN and the data indicating the lesion region. The lesion detection unit 312 may be configured to detect one lesion by using one CNN or detect a plurality of lesions by using one CNN. The CNN has been described above as an example of a detector, the CNN may be a detector based on machine learning and deep learning or a detector that detects a lesion by using an image processing technique based on the feature quantity.

The detection result acquisition unit 313 acquires a result of the lesion detection by the lesion detection unit 312. The detection result acquisition unit 313 may acquire one lesion or a plurality of lesions depending on the number of lesions detected by the detector. The detection result acquired by the detection result acquisition unit 313 is information about the type of the detected lesion and information that identifies the position of the lesion. The information about the type of the detected lesion is, for example, an identifier (ID) uniquely assigned to each type of lesion. The information that identifies the position of the lesion is, for example, a mask image that can be displayed by superimposing on coordinate information and medical image data. The information that identifies the position of the lesion may be different for each type of lesion.

The instruction reception unit 314 receives from the user a specification for at least one lesion from the result of the lesion detection acquired by the detection result acquisition unit 313. The result of the lesion detection acquired by the detection result acquisition unit 313 is displayed in a list manner on the display control unit 316. The instruction reception unit 314 receives a lesion specification instruction through a left-click operation of the mouse 210 by the user. The instruction reception unit 314 may receive a user instruction for changing the highlight position in the detection result with the arrow keys and the TAB key on the keyboard 209 and a specification instruction with a combination of the ENTER key and the space key.

The related lesion information acquisition unit 315 identifies related lesions as lesions related with the target lesion specified by the user via the instruction reception unit 314, the lesions being of different types from the target lesion. For example, the related lesion information acquisition unit 315 maintains the relations between the lesion type and the related lesion types as tabular format information, and identifies the related lesions based on the table. When a plurality of lesions is specified by the user, the instruction reception unit 314 ORs or ANDs related lesion types obtained from the table for each specified lesion type. Which of OR and AND is to be used may be preselected by the information processing apparatus 101 as setting information, selected by the user as required via the instruction reception unit 314, or selected by the information processing apparatus 101 according to the combination of specified lesions. The related lesion information acquisition unit 315 may maintain combinations of a plurality of lesion types and the corresponding related lesion types as tabular format information and identify related lesions by using the information. The related lesion information acquisition unit 315 may also identify related lesions from a combination of a plurality of lesion types based on a set rule. The table and rule used by the related lesion information acquisition unit 315 to acquire related lesions may be pre-generated based on medical knowledge. Examples of medical knowledge include relations between a primary focus and metastatic focuses, relations between complications, and relations that define types of lesions related to the evaluation of the severity risk. Examples of relations between a primary focus and metastatic focuses will be described below. For a pulmonary nodule suspected to be a primary lung cancer, related lesions include a tumor mass of a chest wall, peritoneum, liver, and pancreas that are considered as metastatic positions of a primary lung cancer. For a pulmonary nodule suspected to be a metastatic lung cancer, related lesions include a tumor mass of a large intestine, kidney, and mammary gland that are considered as primary focuses. For a lung reticulation that is possibly a complication of an articular rheumatism, related lesions include tendovaginitis, bone erosion, and osteitis for the discrimination. For a pancreatitis, related lesions include pancreas hypertrophy and pancreas necrosis for the determination of the severity risk.

The related lesion information acquisition unit 315 acquires information about the operating state of the detection processing for detecting a specified lesion. The operating state acquired by the related lesion information acquisition unit 315 is information about whether the lesion detection unit 312 has implemented the lesion detection processing for each lesion type. The operating state acquired by the related lesion information acquisition unit 315 may include the implementation of the lesion detection processing, i.e., a state where the lesion detection processing has been started but has not been ended. The related lesion information acquisition unit 315 acquires the operating state of the detection processing for detecting a specified lesion, detects the specified lesion, and determines whether related lesions are identified. For example, if the detection processing for detecting a specified lesion is operating, the related lesion information acquisition unit 315 can grasp whether related lesions are detected as a result of the detection processing. If the detection processing for detecting a specified lesion is not operating, the related lesion information acquisition unit 315 can grasp that the detection processing is not performed. Since the reason why the detection processing is not operating is displayed (described below), the user can introduce a detector that performs the detection processing and issue an instruction for processing and editing medical data to perform the detection processing.

When the lesion detection unit 312 is currently implementing the lesion detection processing, the related lesion information acquisition unit 315 may acquire the progress and remaining time of the detection processing together. The related lesion information acquisition unit 315 may acquire the operating state for all lesion types, or may acquire only the operating state of the detection processing for the related lesions related with the lesion specified by the user. The related lesion information acquisition unit 315 may acquire results for the related lesions. In this case, the display control unit 316 (described below) controls the display unit to display detection results for the related lesions.

The display control unit 316 controls the display unit to display information about the related lesions acquired by the related lesion information acquisition unit 315. For example, the display control unit 316 controls the display unit (the display 207) to display the information about the related lesions, for example, by displaying the result of the related lesion detection and the operating state of the detection processing in an associated way.

The display control unit 316 also displays the medical image data 321-*i* (i=1, 2, 3, . . . ) acquired by the image data acquisition unit 311 and the result of the related lesion detection acquired by the related lesion information acquisition unit 315, on the display unit (display 207). The display control unit 316 displays the result of detecting the related lesions related with the lesion specified by the user so as to be distinguished from the results of detecting other lesions. The present exemplary embodiment will be described below centering on a form in which the display control unit 316 displays the related lesions and other lesions in different display areas. For example, these lesions may be displayed with different characters, different background colors, or different icon images. The display control unit 316 controls the display unit to display the operating state of the detection processing so that the operating state for the related lesions can be distinguished. The display control unit 316 may also identifiably display the medical image data, the detection result, and the result of the related lesions. The present exemplary embodiment will be described below centering on a form in which the display control unit 316 controls the display unit to perform display in a different display area, similarly to that of the detection result. However, display may be performed, for example, with different characters, different background colors, or different icon images.

(User Interface Screens)

Figure 4:
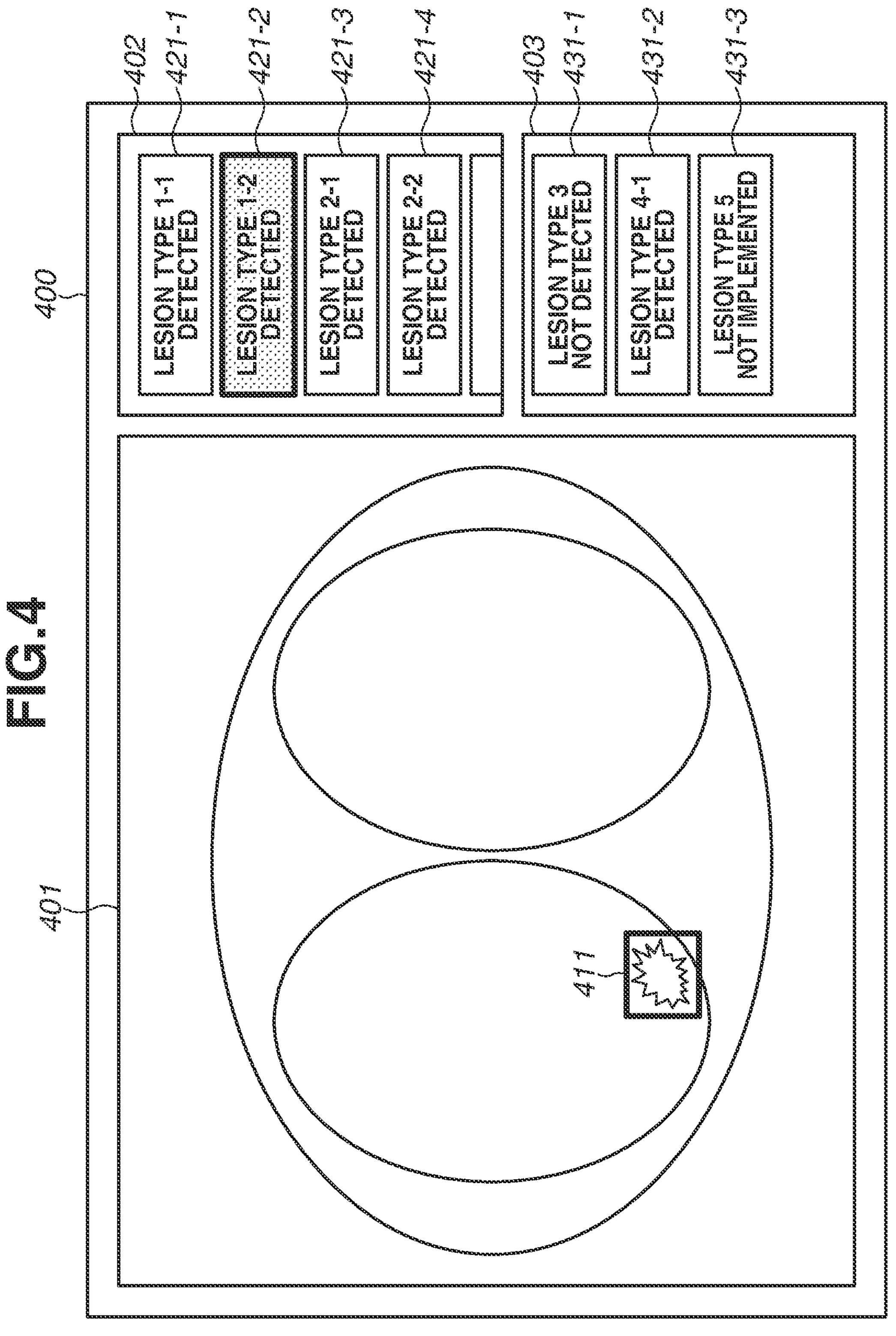
FIG. 4 illustrates an example of a user interface screen of the information processing apparatus according to the first exemplary embodiment.

FIG. 4 illustrates an example of a user interface screen displayed on the display unit by the display control unit 316 of the information processing apparatus 101 according to the present exemplary embodiment. The user interface screen is displayed on the display unit (the display 207), and various operations by the user are input via the keyboard 209 and the mouse 210.

Referring to FIG. 4, a user interface screen 400 includes a medical image data display area 401, a lesion detection result display area 402, and a related lesion detection result display area 403.

The display control unit 316 controls the display unit to display the medical image data acquired by the image data acquisition unit 311, in the medical image data display area 401. In the medical image data display area 401, the user changes Window Level/Window Width (WL/WW), slice position, and magnification of the image in response to operations via the keyboard 209 and the mouse 210. The display control unit 316 controls the display unit to display an annotation 411 indicating the position of the specified lesion based on the result of the lesion detection acquired by the detection result acquisition unit 313, in the medical image data display area 401. The display control unit 316 may display an overlay image that highlights the lesion region corresponding to the lesion position, in the medical image data display area 401.

The display control unit 316 controls the display unit to display the result of the lesion detection (lesion detection result) 421-*i* (i=1, 2, 3, 4, . . . ) acquired by the detection result acquisition unit 313, in the lesion detection result display area 402. The display unit (the display 207) displays only the lesion detected as the lesion detection result 421-*i* (i=1, 2, 3, 4, . . . ) in the lesion detection result display area 402. The lesion detection result 421-1 indicates that the lesion of "lesion type 1-1" is detected. In the lesion detection result display area 402, the user can specify the result of the lesion detection by left-clicking on the result of the lesion detection with the mouse 210. For example, the display control unit 316 controls the display unit to highlight the frame line and background for the specified detection result, as illustrated in the lesion detection result 421-2. The display control unit 316 also updates the annotation 411 according to the specification of the result of the lesion detection based on the corresponding lesion detection position. The display control unit 316 also updates the contents of the related lesion detection result display area 403 based on the result of the related lesion detection acquired by the related lesion information acquisition unit 315.

The display control unit 316 controls the display unit to display the result of the related lesion detection (related lesion detection result) 431-*i* (i=1, 2, 3, 4, . . . ) acquired by the related lesion information acquisition unit 315, in the related lesion detection result display area 403. The display control unit 316 displays the lesion types of the related lesions as the related lesion detection result 431-*i* (i=1, 2, 3, 4, . . . ). When no related lesion is detected, the display control unit 316 controls the display unit to display that no related lesion is detected, in the related lesion detection result display area 403, as illustrated by the related lesion detection result 431-1. The display control unit 316 controls the display unit to display also the operating state of the lesion detection processing acquired by the related lesion information acquisition unit 315, in the related lesion detection result 431-*i* (i=1, 2, 3, 4, . . . ). The related lesion detection result 431-3 indicates that the lesion detection is not implemented as the operating state.

The display of the related lesion detection results 431-1 and 431-2 enables the user to grasp the result of detection of the related lesions as lesions related with the lesion targeted by the user, the related lesions being of different types from the target lesion. The display of the related lesion detection result 431-3 enables the user to confirm such a status that the processing for detecting the related lesions is not implemented.

(Processing Flow)

Figure 5:
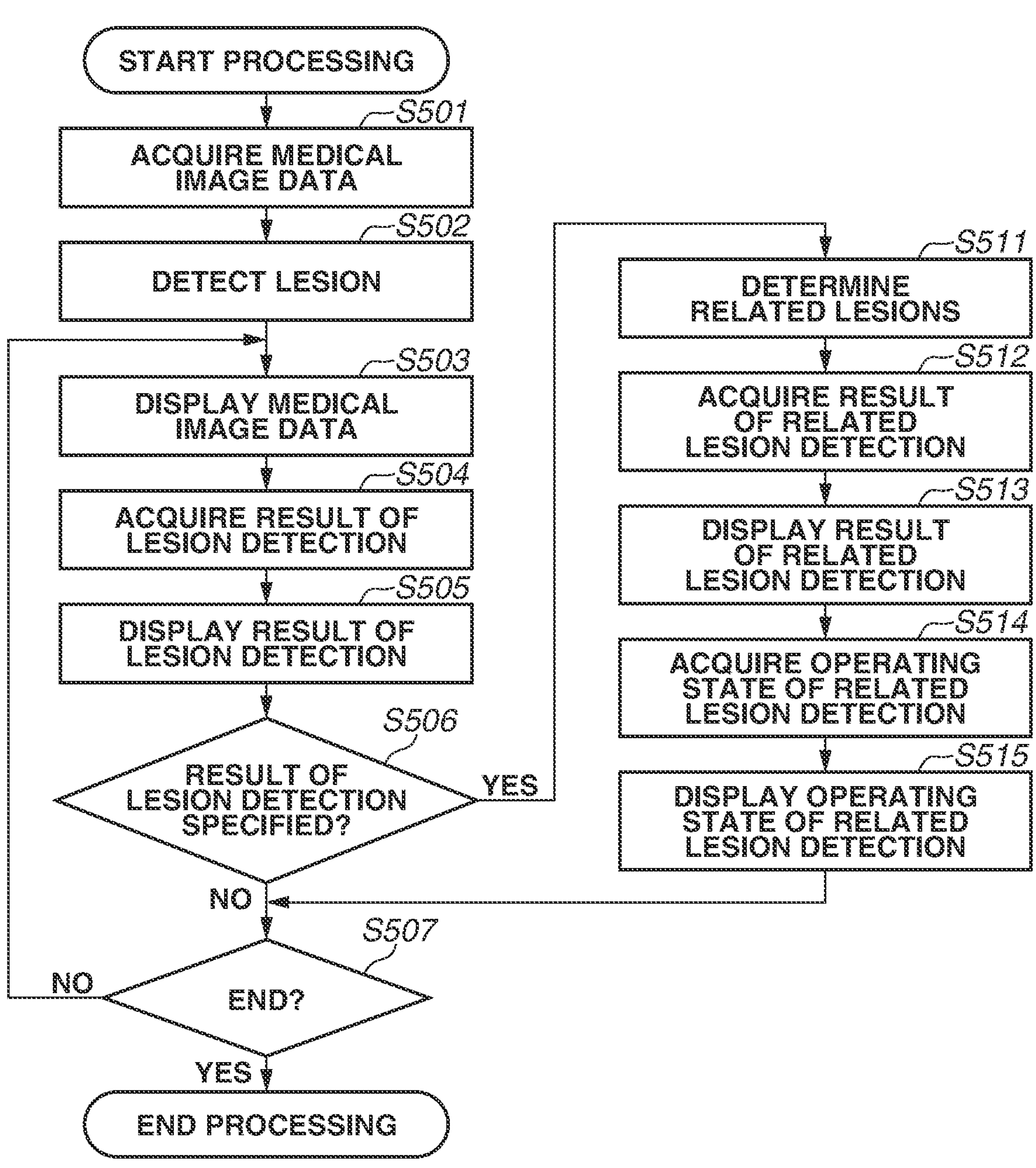
FIG. 5 is a flowchart illustrating processing of the information processing apparatus according to the first exemplary embodiment.

FIG. 5 is a flowchart illustrating processing of the information processing apparatus 101 according to the present exemplary embodiment. After the activation of the information processing apparatus 101, the information processing apparatus 101 starts report generation processing based on an instruction from other systems or the user. When starting processing, a medical case to be processed is specified.

In step S501, the image data acquisition unit 311 acquires the medical image data 321-*i* (i=1, 2, 3, . . . ) of the medical case specified at the time of the activation from the medical case DB 102 via the LAN 103. Then, the processing proceeds to the next step.

In step S502, the lesion detection unit 312 detects a lesion from the medical image data 321-*i* (i=1, 2, 3, . . . ) acquired in step S501. The lesion detection unit 312 performs the detection processing by using a detector that is subjected to learning and generated based on machine learning and deep learning. The detector to be used for the detection processing may be preset. When the lesion detection unit 312 subjects the medical image data to the lesion detection processing, the processing proceeds to the next step.

In step S503, the display control unit 316 controls the display unit to display the medical image data 321-*i* (i=1, 2, 3, . . . ) acquired by the image data acquisition unit 311 in step S501, in the medical image data display area 401 of the user interface screen 400. The user changes the WL/WW, slice position, and magnification of the image to be displayed in response to operations via the keyboard 209 and the mouse 210.

In step S504, the detection result acquisition unit 313 acquires the result of the lesion detection from the lesion detection unit 312. The result of the lesion detection includes information about the types of the detected lesions and information about the lesion position in the medical image data 321-*i* (i=1, 2, 3, . . . ).

In step S505, the display control unit 316 controls the display unit to display the lesion detection result 421-*i* (i=1, 2, 3, 4, . . . ) based on the result of the lesion detection acquired in step S504, in the lesion detection result display area 402 of the user interface screen 400.

In step S506, the instruction reception unit 314 receives an instruction for specifying the user's target lesion for the detected lesions based on inputs from the keyboard 209 and the mouse 210. When the specification of the user's target lesion is detected (YES in step S506), the processing proceeds to step S511. On the other hand, when the specification of the user's target lesion is not detected (NO in step S506), the processing proceeds to step S507.

In step S507, the OS (not illustrated) detects the end processing of the information processing apparatus 101. The end processing includes the OS shutdown operation, power off operation, window closing operation, and process deactivation. When the end processing is detected (YES in step S507), the processing exits the flowchart. On the other hand, when the end processing is not detected (NO in step S507), the processing returns to step S503. Then, the information processing apparatus 101 repeats the processing.

In step S511, based on an instruction for specifying the user's target lesion for the detected lesion detection result in step S506, the related lesion information acquisition unit 315 identifies related lesions as lesions related with the lesion by referring to the table that defines the relation between lesion types.

In step S512, the related lesion information acquisition unit 315 acquires from the detection result acquisition unit 313 the result of detection of the related lesion identified in step S511.

In step S513, the display control unit 316 displays the related lesion detection result 431-*i* (i=1, 2, 3, . . . ) in the related lesion detection result display area 403 of the user interface screen 400 based on the result of the related lesion detection acquired by the related lesion information acquisition unit 315 in step S512.

In step S514, the related lesion information acquisition unit 315 acquires the operating state of the related lesion detection processing for the related lesions determined in step S511. According to the present exemplary embodiment, the operating state has information about the implementation of the lesion detection processing.

In step S515, based on the operating state of the related lesion detection acquired in step S514, the display control unit 316 controls the display unit to display the operating state in the related lesion detection result 431-*i* (i=1, 2, 3, . . . ) in the related lesion detection result display area 403 of the user interface screen 400. When the processing in step S515 is completed, the processing returns to step S507.

As described above, the information processing apparatus 101 of the exemplary embodiment of the present invention includes the display control unit 316 that controls the display unit to display the result of detecting at least one lesion from the medical image data, and information about related lesions related with the target lesion selected for at least one lesion in response to an instruction from the user. The information processing apparatus 101 of the exemplary embodiment of the present invention includes the detection result acquisition unit 313 that acquires the result of detecting a lesion from the medical image data, the instruction reception unit 314 that receives an instruction for specifying a target lesion for the detected lesion, the related lesion information acquisition unit 315 that acquires information about related lesions as lesions related with the specified target lesion, the lesions being of different types from the target lesion, and the display control unit 316 that controls the display unit such as the display 207 to display the information about the related lesions. In this configuration, when the user specifies a target lesion for the lesions detected by the lesion detection unit 312 via the instruction reception unit 314, the related lesion information acquisition unit 315 automatically determines the types of the lesions related with the user's target lesion, and the display control unit 316 displays the result of the related lesion detection on the display unit. This enables efficiently grasping other lesions related with the target lesion of the user such as a doctor. Even when the number of detection target lesions increases, the user is able to easily find the presence or absence of the detection result of other related lesions. Further, the display control unit 316 controls the display unit to display the operating state of the lesion detection processing. When no lesion is detected, this configuration makes it easier to distinguish between a state where no lesion is detected with CADe performed and a state where no lesion is detected with CADe not performed.

(Modification of First Exemplary Embodiment)

The information processing apparatus 101 may be an image processing workstation, an integrated viewer for integrally displaying electronic charts and information from a plurality of types of apparatuses, and an apparatus for capturing medical images such as an ultrasonic diagnostic apparatus.

The lesion detection unit 312 may exist on another apparatus such as an image processing server connected with the information processing apparatus 101 via a network. The lesion detection unit 312 may detect a lesion at the timing when the medical image data 321-*i* (i=1, 2, 3, . . . ) is captured, at the timing when the data is stored in the medical case DB 102, or during other background processing, and store the detection result in a storage device such as the medical case DB 102. In this case, the detection result acquisition unit 313 acquires the detection result from the storage device.

The lesion detection unit 312 as a detector may detect a lesion by using a method other than CNN, such as Support Vector Machine (SVM) as one of machine learning techniques.

The detection result acquisition unit 313 may acquire whether a lesion is detected, the position of the detected lesion, and other information related to the detection result, such as the progress of the processing and the remaining time till the end of the processing.

The related lesion information acquisition unit 315 also extracts medical knowledge by subjecting past radiogram interpretation reports, theses, and medical care guidelines to language processing to generate tables and rules to be used to determine related lesions.

An information processing apparatus 101 according to a second exemplary embodiment includes the information processing apparatus 101 according to the first exemplary embodiment, and additionally includes functions of acquiring and displaying information about the feasibility of the detection processing when the operating state of the related lesion detection is "Not Implemented". The information processing apparatus 101 receives an instruction for implementing the lesion detection when the detection processing is not implemented and feasible. In the present exemplary embodiment, the system configuration of the information processing apparatus 101 is similar to that according to the first exemplary embodiment described above with reference to FIG. 1, the hardware configuration is similar to that according to the first exemplary embodiment described above with reference to FIG. 2, and redundant descriptions thereof will be omitted.

(Functional Blocks)

Figure 6:
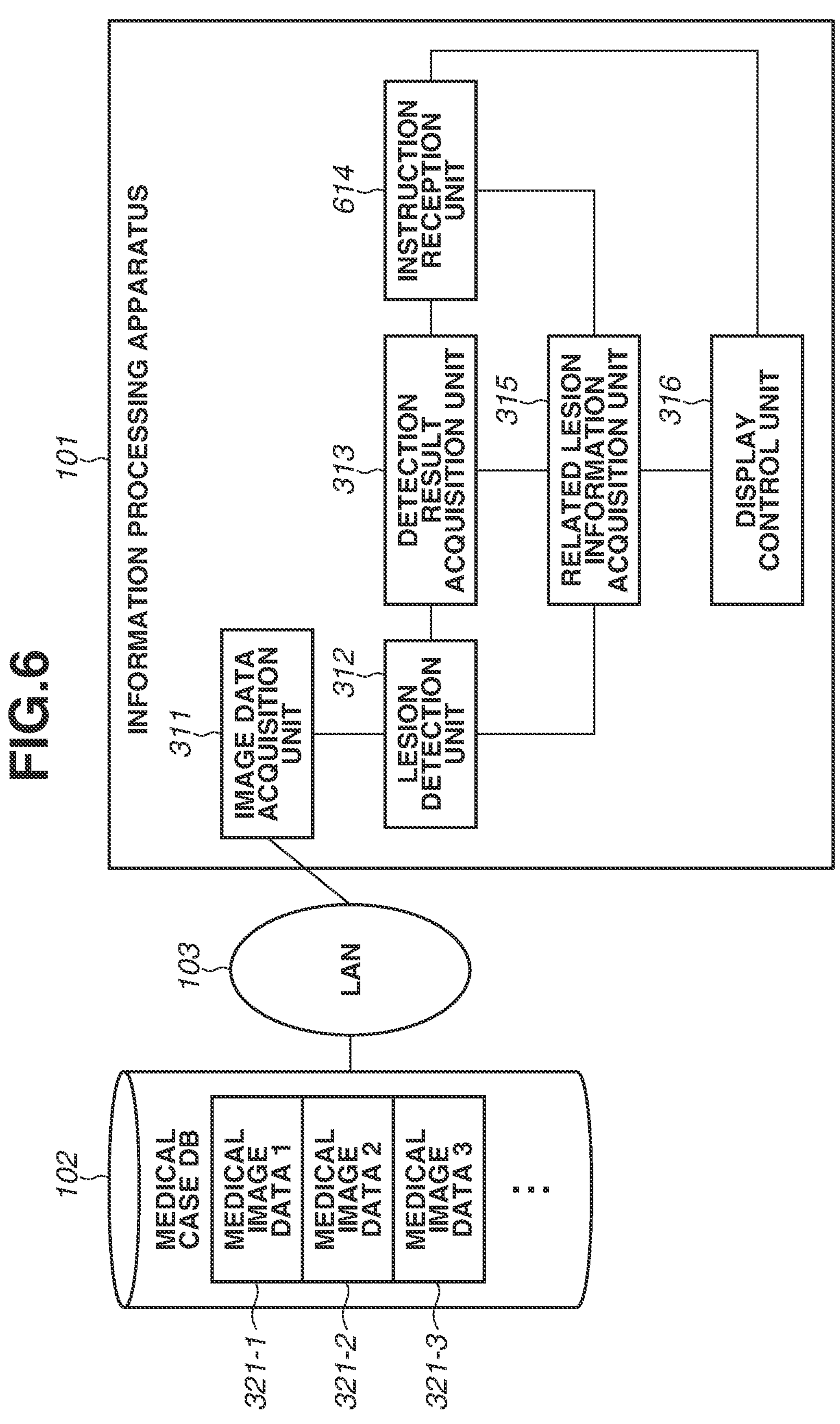
FIG. 6 illustrates a functional configuration of an information processing apparatus according to a second exemplary embodiment.

FIG. 6 illustrates a functional configuration of the information processing apparatus 101 according to the present exemplary embodiment. Function blocks identical to the function blocks according to the first exemplary embodiment described above with reference to FIG. 3 are assigned the same reference numerals, and redundant descriptions thereof will be omitted.

Referring to FIG. 6, a instruction reception unit 614 of the information processing apparatus 101 according to the present exemplary embodiment receives an instruction for implementing the detection processing. The instruction reception unit 614 receives an additional instruction from the user according to the operating state acquired by the related lesion information acquisition unit 315. According to the present exemplary embodiment, when the operating state of the processing for detecting a predetermined lesion acquired by the related lesion information acquisition unit 315 is "Not Implemented", and the operating state for the feasibility of the detection processing is "Feasible", the instruction reception unit 614 receives an instruction for the processing for detecting the lesion by the lesion detection unit 312 from the user. Upon reception of an instruction for implementing the additional lesion detection processing from the user, the instruction reception unit 614 instructs the lesion detection unit 312 to implement the additional lesion detection processing. According to the present exemplary embodiment, the additional lesion detection processing is implemented upon reception of a user instruction by the instruction reception unit 614. However, the related lesion information acquisition unit 315 may implement the additional detection processing without receiving a confirmation input from the user.

(User Interface Screen)

Figure 7:
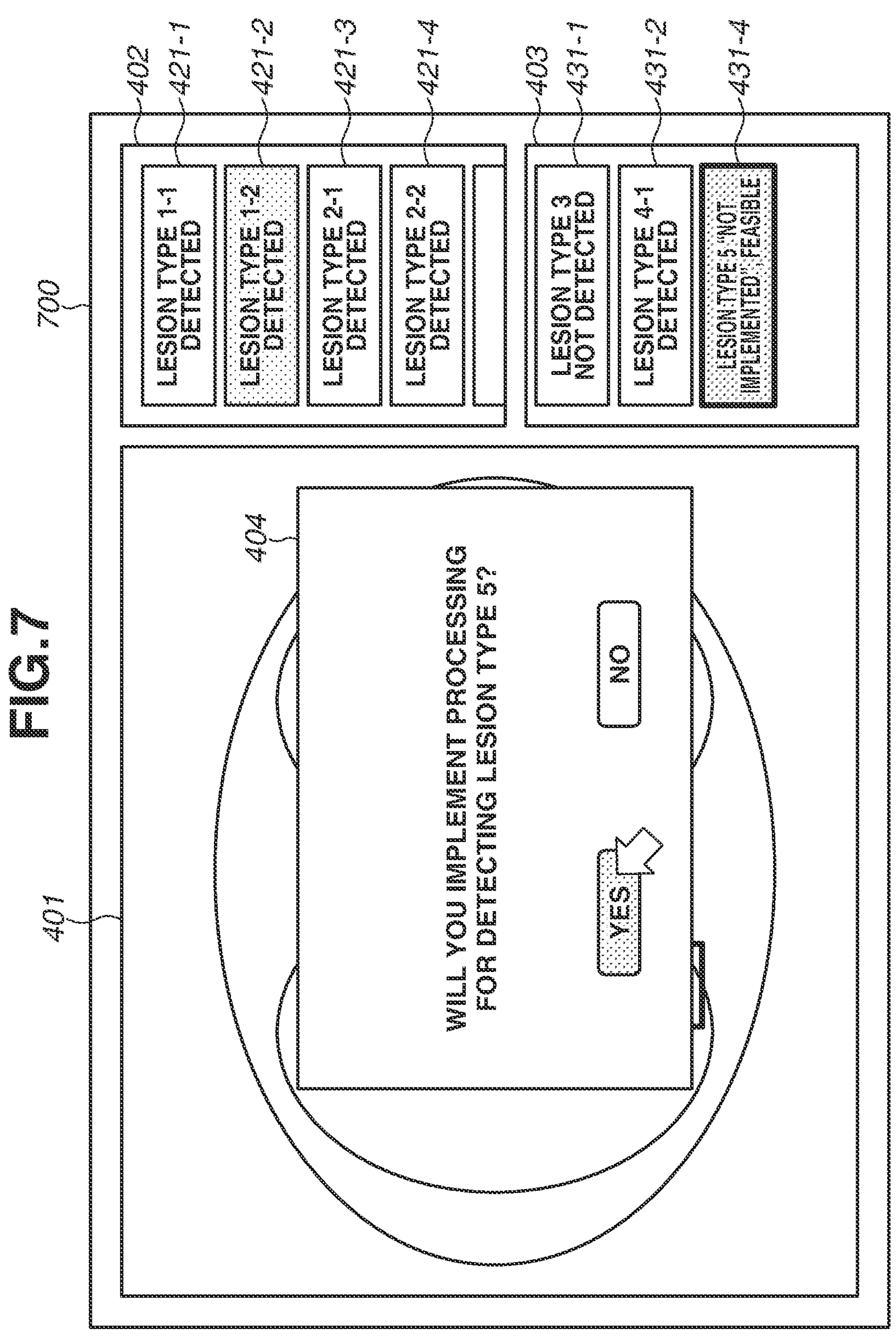
FIG. 7 illustrates an example of a user interface screen of the information processing apparatus according to the second exemplary embodiment.

FIG. 7 illustrates an example of a user interface screen displayed by the display control unit 316 in the information processing apparatus 101 according to the present exemplary embodiment. Elements identical to the elements of the user interface according to the first exemplary embodiment described above with reference to FIG. 4 are assigned the same reference numerals, and redundant descriptions thereof will be omitted.

A user interface screen 700 displays the information in the user interface screen 400 according to the first exemplary embodiment and, when the operating state of the detection processing is "Not Implemented", additionally displays information about the feasibility of the detection processing in the related lesion detection result 431-*i* (i=1, 2, 3, . . . ). The display control unit 316 displays a lesion detection instruction check window 404 that is associated with the instruction reception unit 614.

The lesion detection instruction check window 404 is used by the instruction reception unit 614 to receive an instruction for implementing the lesion detection processing from the user. The display control unit 316 controls the display unit to display the lesion detection instruction check window 404, and a lesion detection result (the related lesion detection result 431-4 in FIG. 7) when the operating state of the detection processing regarding the implementation of the detection processing is "Not Implemented", and the operating state of the detection processing regarding the feasibility of the detection processing is "Feasible". When the instruction reception unit 614 receives a user instruction for specifying "Yes" in the lesion detection instruction check window 404, the lesion detection processing is implemented. On the other hand, when the instruction reception unit 614 receives a user instruction for specifying "No", the lesion detection processing is not implemented. The instruction reception unit 614 detects a user's specification instruction based on inputs from the mouse 210 and the keyboard 209.

(Processing Flow)

Figure 8:
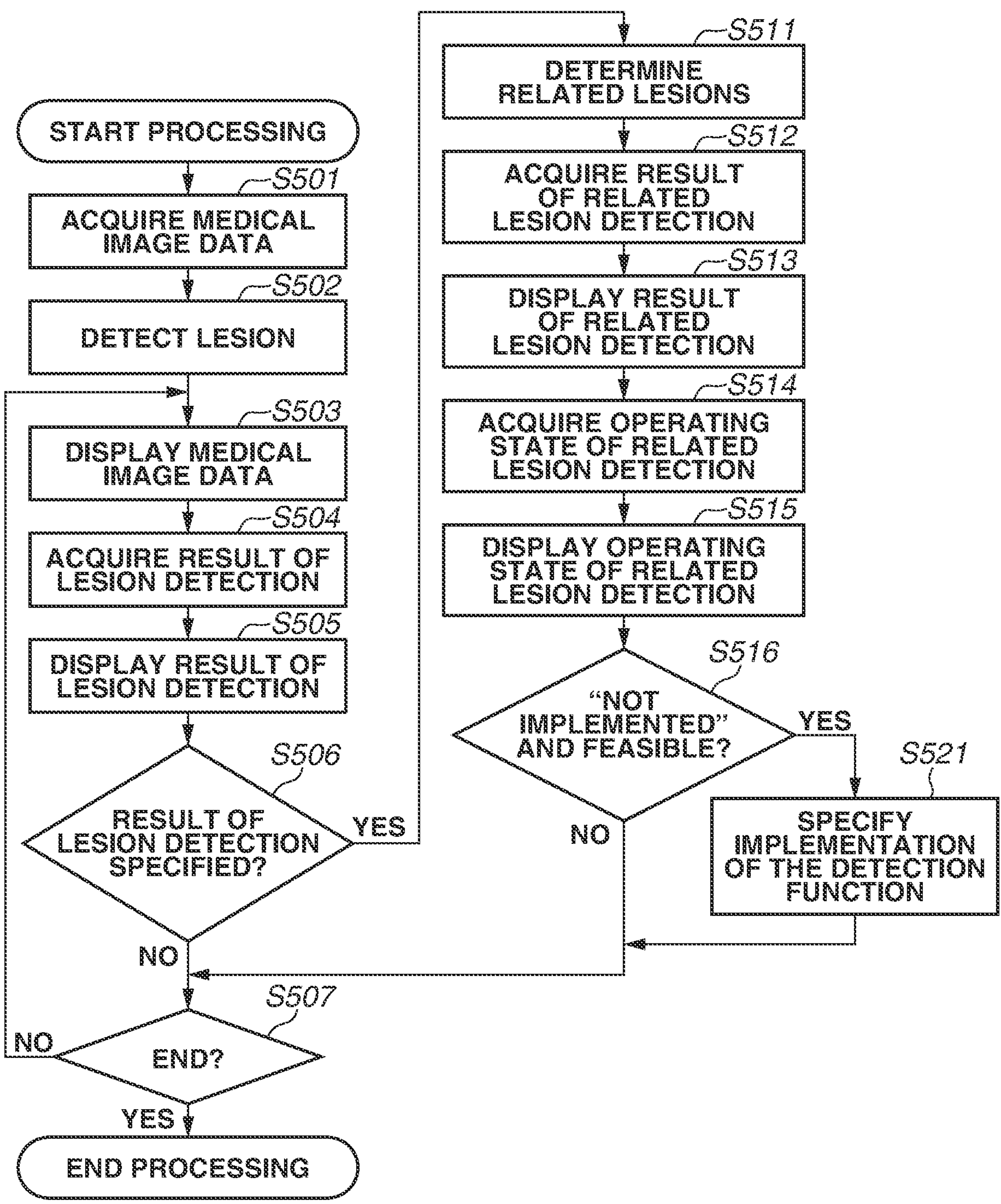
FIG. 8 is a flowchart illustrating processing of the information processing apparatus according to the second exemplary embodiment.

FIG. 8 is a flowchart illustrating processing of the information processing apparatus 101 according to the present exemplary embodiment. Steps identical to the steps of the flowchart according to the first exemplary embodiment described above with reference to FIG. 5 are assigned the same reference numerals, and redundant descriptions thereof will be omitted.

In step S516, the related lesion information acquisition unit 315 determines whether the operating state of the detection processing regarding the lesion specified by a user operation via the instruction reception unit 614 is "Not Implemented" and "Feasible". When the operating state is "Not Implemented" and "Feasible" (YES in step S516), the processing proceeds to step S521. On the other hand, when the operating state is "Not Implemented" and "Infeasible" (NO in step S516), the processing returns to step S507. According to the present exemplary embodiment, the operation information acquired by the related lesion information acquisition unit 315 includes information about the implementation of the detection processing and information about the feasibility of the detection processing.

In step S521, the instruction reception unit 614 receives an instruction for performing the lesion detection processing determined to be "Not Implemented" and "Feasible" by the related lesion information acquisition unit 315 in step S516.

According to the present exemplary embodiment, when the instruction reception unit 614 receives an instruction, the display control unit 316 displays the lesion detection instruction check window 404 illustrated in FIG. 7 and receives a confirmation input from the user. Upon reception of a specification "Yes" from the user in the lesion detection instruction check window 404, the instruction reception unit 614 instructs the lesion detection unit 312 to perform the lesion detection. On the other hand, upon reception of a specification "No", the instruction reception unit 614 ends the processing of this step without instructing the lesion detection unit 312 to perform the lesion detection.

As described above, according to the present exemplary embodiment, when the user specifies the lesion detected by the lesion detection unit 312, the related lesion information acquisition unit 315 automatically determines the types of the related lesions related with the user's target lesion, and the display control unit 316 displays the result of the related lesion detection. Therefore, even when the number of detection target lesions increases, the user is able to easily find the presence or absence of the detection result of other lesions related with the user's target lesion.

Further, the display control unit 316 controls the display unit to display the operating state of the lesion detection processing. This makes it easier for the user to distinguish between a state where no lesion is detected with CADe performed and a state where no lesion is detected with CADe not performed.

When the lesion detection is "Not Implemented" and "Feasible", the instruction reception unit 614 receives an instruction for performing the additional lesion detection processing from the user, making it easier to implement the lesion detection processing not implemented.

(Modification of Second Exemplary Embodiment)

The present exemplary embodiment has been described above centering on a case where the instruction reception unit 614 receives an instruction for the lesion detection processing, and the lesion detection unit 312 performs the additional lesion detection based on a user instruction. However, the instruction reception unit 614 does not need to receive a user instruction. In this case, the related lesion information acquisition unit 315 may instruct the lesion detection unit 312 to perform the detection processing not implemented.

An information processing apparatus 101 according to a third exemplary embodiment includes the information processing apparatus 101 according to the second exemplary embodiment, and additionally includes a function of the display control unit 316 to control the display unit to display information about the reason of infeasibility when the operating state for the related lesion detection is "Infeasible". When the detection processing is infeasible because the detection processing function is not installed, the related lesion information acquisition unit 315 receives an instruction for installing the detection processing function via the instruction reception unit 614. When the detection processing is infeasible because the medical image data is out of the implementation condition for the detection processing, the related lesion information acquisition unit 315 receives an instruction for acquiring the medical image data that satisfies the implementation condition. The system configuration and the hardware configuration of the information processing apparatus 101 according to the present exemplary embodiment are similar to those according to the first exemplary embodiment described above with reference to FIGS. 1 and 2, respectively, and the function block according to the present exemplary embodiment is similar to that according to the second exemplary embodiment described above with reference to FIG. 6, and redundant descriptions thereof will be omitted.

(User Interface Screens)

Figure 9A:
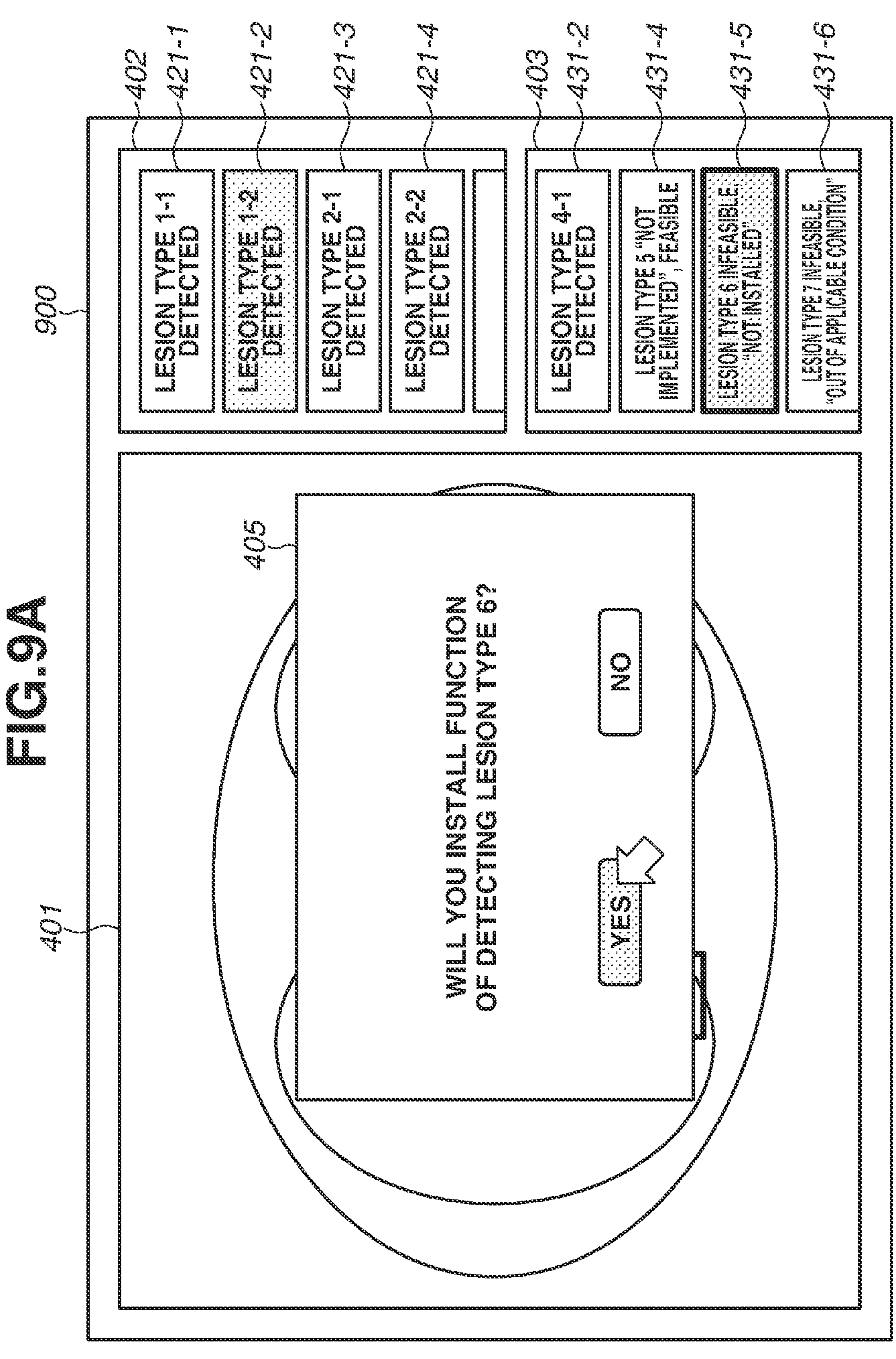
FIG. 9A illustrates an example of a user interface screen of an information processing apparatus according to a third exemplary embodiment.

FIGS. 9A and 9B are examples of user interface screens displayed by the display control unit 316 of the information processing apparatus 101 according to the present exemplary embodiment. Elements identical to the elements of the user interfaces according to the first and second exemplary embodiments described above with reference to FIGS. 4 and 7 are assigned the same reference numerals, and redundant descriptions thereof will be omitted.

A user interface screen 900 displayed on the display unit by the display control unit 316 includes the user interface screen 700 according to the second exemplary embodiment. In addition, when the information about the operating state (feasibility of the detection processing) is "Infeasible", the user interface screen 900 displays the reason of the infeasibility. In this case, the instruction reception unit 614 receives an additional instruction from the user. The user interface screen 900 displayed on the display unit by the display control unit 316 includes a lesion detection installation instruction check window 405 and an implementation condition image acquisition instruction check window 406.

In the user interface screen 900 displayed on the display unit by the display control unit 316, a related lesion detection result 431-5 indicates that the detection processing is infeasible because the detection processing function is "Not Installed" and a related lesion detection result 431-6 indicates that the detection processing is infeasible because the medical image data to be subjected to the lesion detection processing is "Out of Applicable Condition" for the detection processing.

The lesion detection installation instruction check window 405 displayed on the display unit such as the display 207 by the display control unit 316 is used by the instruction reception unit 614 to check whether the user issues an instruction for installing the lesion detection function. The display control unit 316 controls the display unit to display the lesion detection installation instruction check window 405 when the user specifies a lesion for which the detection processing is infeasible because the detection processing function is not installed (the related lesion detection result 431-5 in FIG. 9A). When the user specifies "Yes" in the lesion detection installation instruction check window 405, the instruction reception unit 614 instructs the lesion detection unit 312 to install the lesion detection processing function. On the other hand, when the user specifies "No", the instruction reception unit 614 does not instruct the lesion detection unit 312 to install the lesion detection processing function. The instruction reception unit 614 detects a user's specification instruction based on inputs from the mouse 210 and the keyboard 209. The instruction for installing the detection processing function via the instruction reception unit 614 is, for example, key entries for software installation and software activation.

The implementation condition image acquisition instruction check window 406 displayed on the display unit by the display control unit 316 is used by the instruction reception unit 614 to check whether the user issues an instruction for acquiring the medical image data that satisfies the implementation condition for the lesion detection processing. The implementation condition image acquisition instruction check window 406 is displayed when the user specifies a lesion for which the detection processing is infeasible because the medical image data is out of the applicable condition for the lesion detection processing (the related lesion detection result 431-6 in FIG. 9B). When the user specifies "Yes" in the implementation condition image acquisition instruction check window 406, the instruction reception unit 614 instructs the image data acquisition unit 311 to acquire the medical image data. On the other hand, when the user specifies "No", the instruction reception unit 614 does not instruct the image data acquisition unit 311 to acquire the medical image data. The instruction reception unit 614 detects a user's specification instruction based on inputs from the mouse 210 and the keyboard 209. The implementation condition image acquisition instruction check window 406 includes a user interface for issuing instructions for adding and changing condition specifications. The applicable condition for the lesion detection processing includes the modality that captures images, reconfiguration function, radiographic contrasting condition, time phase, and imaging range. An instruction for acquiring medical image data includes condition-based image reconfiguration and an image capturing order to an ordering system.

(Processing Flow)

Figure 10:
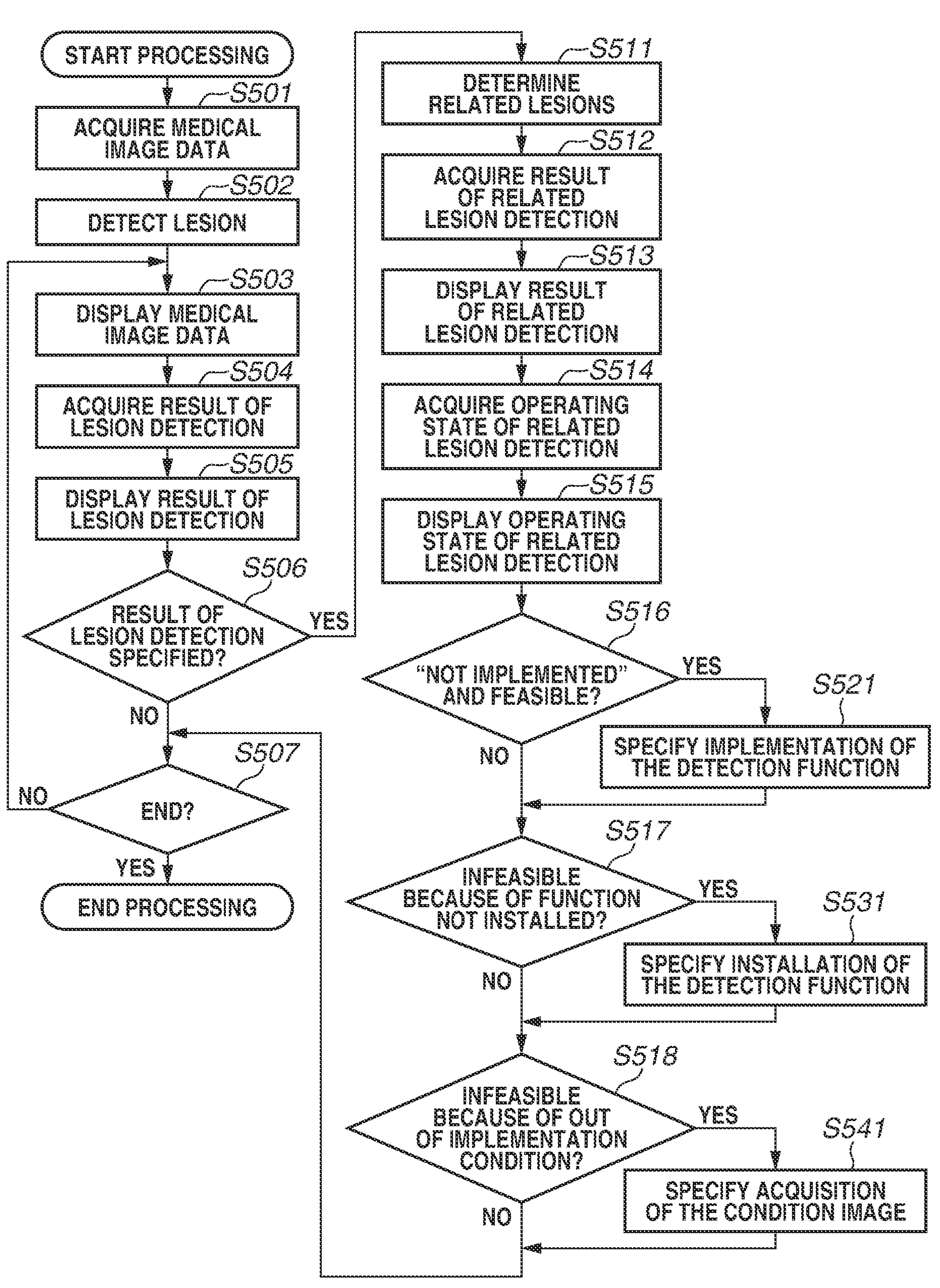
FIG. 10 is a flowchart illustrating processing of the information processing apparatus according to the third exemplary embodiment.

FIG. 10 illustrates a processing flow of the information processing apparatus 101 according to the present exemplary embodiment. Steps identical to the steps of the flowcharts according to the first and second exemplary embodiments described above with reference to FIGS. 5 and 8, respectively, are assigned the same reference numerals, and redundant descriptions thereof will be omitted.

In step S517, the related lesion information acquisition unit 315 determines whether the operating state of the detection processing regarding the lesion specified by a user operation is "Infeasible" because the detection processing function is not installed. When the detection processing is infeasible because the detection processing function is not installed (YES in step S517), the processing proceeds to step S531. On the other hand, when the detection processing is infeasible not because the detection processing function is not installed (NO in step S517), the processing proceeds to step S518. According to the present exemplary embodiment, the operation information acquired by the related lesion information acquisition unit 315 includes information about the implementation of the detection processing, information about the feasibility of the detection processing, and the reason why the detection processing is infeasible.

In step S531, the CPU 203 instructs the lesion detection unit 312 to perform the lesion detection function installation specified by the user via the instruction reception unit 614. According to the present exemplary embodiment, when the instruction reception unit 614 instructs the lesion detection unit 312 to an install the detection function, the display control unit 316 controls the display unit of the display 207 to display the lesion detection installation instruction check window 405 illustrated in FIG. 9A. Then, the instruction reception unit 614 receives a confirmation input from the user. Upon reception of a specification "Yes" in the lesion detection installation instruction check window 405, the instruction reception unit 614 instructs the lesion detection unit 312 to install the lesion detection processing function. On the other hand, upon reception of a specification "No", the instruction reception unit 614 ends the processing of this step without instructing the lesion detection unit 312 to install the lesion detection processing function.

In step S518, the related lesion information acquisition unit 315 determines whether the operating state of the detection processing regarding the lesion specified by a user operation is "Infeasible" because the medical image data is out of the implementation condition for the lesion detection processing. When the lesion detection processing is infeasible because the medical image data is out of the implementation condition for the lesion detection processing (YES in step S518), the processing proceeds to step S541. On the other hand, when the lesion detection processing is infeasible not because the medical image data is out of the implementation condition for the lesion detection processing (NO in step S518), the processing returns to step S507.

In step S541 (when the related lesion information acquisition unit 315 determines that the implementation of the detection processing is infeasible because the medical image data is out of the implementation condition in step S518), the related lesion information acquisition unit 315 instructs the image data acquisition unit 311 to acquire the medical image data that satisfies the implementation condition for the lesion detection processing corresponding to the lesion detection result. According to the present exemplary embodiment, the display control unit 316 controls the display unit of the display 207 to display the implementation condition image acquisition instruction check window 406 illustrated in FIG. 9B and receives an input of a confirmation for the implementation of the processing for acquiring medical image data that satisfies the implementation condition from the user. When the instruction reception unit 614 detects a specification "Yes" in the implementation condition image acquisition instruction check window 406, the related lesion information acquisition unit 315 instructs the image data acquisition unit 311 to acquire the medical image data that satisfies the implementation condition. On the other hand, when the instruction reception unit 614 detects a specification "No", the related lesion information acquisition unit 315 ends the processing of this step without instructing the image data acquisition unit 311 to acquire the medical image data. The image data acquisition unit 311 may generate the medical image data that satisfies the implementation condition based on the obtained medical image data, acquire the medical image data from the outside, or transmit an acquisition order to an ordering system.

As described above, according to the present exemplary embodiment, when the user specifies the lesion detected by the lesion detection unit 312, the related lesion information acquisition unit 315 automatically determines the types of the related lesions, and the display control unit 316 displays the result of detecting the related lesions related with the user's target lesion. Therefore, even when the number of detection target lesions increases, the user is able to easily find the presence or absence of the detection result of other lesions related with the user's target lesion.

The display control unit 316 controls the display unit to display the operating state of the lesion detection processing. This makes it easier for the user to distinguish between a state where no lesion is detected with CADe performed and a state where no lesion is detected with CADe not performed.

When the lesion detection processing is "Not Implemented" and "Feasible", the related lesion information acquisition unit 315 issues an instruction for the lesion detection processing, making it easier to implement the lesion detection not implemented.

When the lesion detection processing is infeasible because the detection processing function is not installed, the related lesion information acquisition unit 315 issues an instruction for installing the lesion detection processing, making it easier to install the required lesion detection function.

When the lesion detection processing is infeasible because the medical image data is out of the implementation condition, the related lesion information acquisition unit 315 issues an instruction for acquiring the medical image data that satisfies the implementation condition, making it easier to acquire the required medical image data.

OTHER EXEMPLARY EMBODIMENTS

The present invention is implemented also by performing the following processing. More specifically, software (program) for implementing the functions of the above-described exemplary embodiments is supplied to a system or apparatus via a network or various types of storage media, and a computer (CPU or micro processing unit (MPU)) of the system or apparatus reads and executes the program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-184189, filed Nov. 11, 2021, which is hereby incorporated by reference herein in its entirety.

What is claimed is:

1. An information processing apparatus comprising:

a memory storing instructions, and at least one processor configured to execute the instructions to:

acquire medical image data;

receive an instruction for specifying a target lesion in the medical image data;

acquire (i) related lesion information about a related lesion, the related lesion being related with the target lesion specified by the instruction and of a different type from the target lesion, and (ii) operating state information including information as to whether detection processing for the related lesion has been implemented; and cause a display to display the related lesion information and the operating state information so that the operating state information corresponds to the related lesion information visually.

2. The information processing apparatus according to claim 1, wherein the operating state information further includes information about feasibility of the detection processing for the related lesion.

3. The information processing apparatus according to claim 2, wherein the at least one processor is configured to, in a case where the detection processing is feasible, receive an instruction for implementing the detection processing.

4. The information processing apparatus according to claim 2, wherein, in a case where the detection processing is infeasible, the at least one processor is configured to cause the display to display information about a reason why the detection processing is infeasible.

5. The information processing apparatus according to claim 4, wherein the information about the reason why the detection processing is infeasible includes information indicating that a detector for performing detection processing for a related lesion is not installed.

6. The information processing apparatus according to claim 5, wherein the at least one processor is configured to receive an instruction for installing the detector not installed.

7. The information processing apparatus according to claim 4, wherein the information about the reason why the detection processing is infeasible includes information indicating that the medical image data is out of an implementation condition for the detection processing.

8. The information processing apparatus according to claim 7, wherein, in a case where the medical image data is out of the implementation condition for the detection processing, the at least one processor is configured to receive an instruction for acquiring medical image data that satisfies the implementation condition.

9. The information processing apparatus according to claim 1, wherein the at least one processor is configured to acquire the related lesion information by referring to a table that associates types of lesions.

10. The information processing apparatus according to claim 9, wherein the table is generated based on at least one of relations between a primary focus and metastatic focuses, relations between complications, and relations that define types of lesions related to an evaluation of a severity risk.

11. The information processing apparatus according to claim 1, wherein the at least one processor is configured to acquire a result of the detection processing, and cause the display to display the result of the detection processing.

12. The information processing apparatus according to claim 1, wherein the at least one processor is configured to cause the display to display identifiably the medical image data, a detection result of the detection processing, and the related lesion information and the operating state information.

13. An information processing method comprising:

acquiring medical image data;

receiving an instruction for specifying a target lesion in the medical image data;

acquiring (i) related lesion information about a related lesion, the related lesion being related with the target lesion specified by the instruction and of a different type from the target lesion, and (ii) operating state information including information as to whether detection processing for the related lesion has been implemented; and causing a display to display the related lesion information and the operating state information so that the operating state information corresponds to the related lesion information visually.

14. A non-transitory computer-readable storage medium storing a program that when executed on a computer causes the computer to execute the information processing method according to claim 13.

* * * * *